(No Model.)
A. A. MUNRO.
CYCLE.
No. 572,941. Patented Dec. 8, 1896.
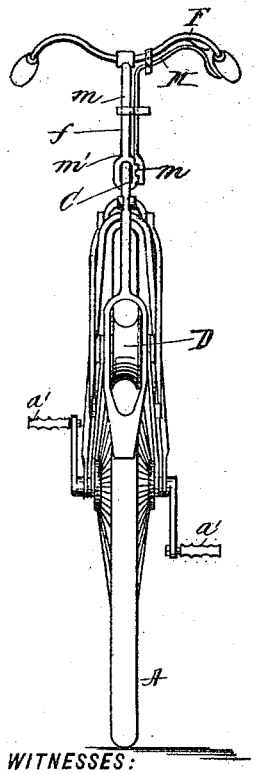
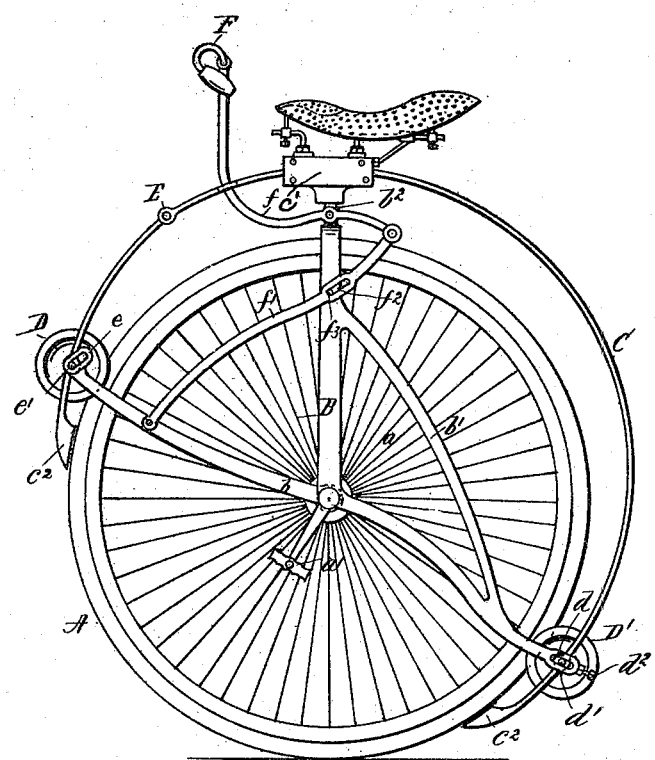
WITNESSES:
Harry J. Perkins.
L. M. Muller.
INVENTOR
Andrew A. Munro,
BY
Edgar Tate
ATTORNEYS

UNITED STATES PATENT OFFICE.

ANDREW A. MUNRO, OF FLUSHING, NEW YORK.

CYCLE.

SPECIFICATION forming part of Letters Patent No. 572,941, dated December 8, 1896.

Application filed June 25, 1896. Serial No. 553,996. (No model.)

*To all whom it may concern:*

Be it known that I, ANDREW A. MUNRO, a citizen of the United States, and a resident of Flushing, county of Queens, and State of New York, have invented certain new and useful Improvements in Monocycles, of which the following is a specification, reference being had to the accompanying drawings, forming a part thereof, in which similar letters of reference indicate corresponding parts in both figures.

This invention relates to certain new and useful improvements in monocycles; and the object thereof is to provide a simple machine of this character which can be easily employed in the same manner and for the same purpose as an ordinary safety-bicycle.

With this and other objects in view the invention contemplates a single wheel provided with a suitable frame and adapted to be operated in the usual manner by pedals fastened to its axle or sprocket-wheel and chain, friction-wheels arranged nearly diametrically opposite each other, but at a distance less than the diameter of the drive-wheel, one of which wheels is uniformly maintained in a fixed and the other is adapted to be thrown into close frictional contact with the tire of the wheel by a backward movement of the handle-bar.

This invention further consists of certain details of construction and arrangement of parts, which will be fully pointed out and claimed hereinafter.

In the accompanying drawings, Figure 1 is a front elevation of my improved monocycle, and Fig. 2 is a side view of the same.

Similar characters of reference designate like parts throughout the several views.

In the practice of my invention I employ a single wheel A of some approved construction, which is provided with an axle $a$, suitably mounted in the frame of the monocycle, and pedals $a'$ of some preferred form are secured on the ends of said axle or sprocket-wheel in the usual manner. The frame consists of the uprights B, which are connected together above the wheel and project upward in a single stem $b^2$ to receive the saddle-support, the front transverse rods $b$ and the rear transverse rods $d$, and the brace-rods $b'$, running from the uprights. A jointed curved rod C extends more than half-way around the periphery of the wheel and it is securely held in place in the block $c'$, through which it passes, as shown in Fig. 2. The extreme ends of the curved rod are provided with guard-plates $c^2$, which guard is designed to serve as a scraper for the tire of the wheel. Two friction-wheels D D' are carried by said curved rod in front and in rear of the wheel, respectively, and these wheels are arranged apart a distance somewhat less than a diameter of the wheel, the rear friction-wheel D' being also located below the axle of the wheel A, while the front friction-wheel is above said axle. The lower rear friction-wheel maintains a uniform contact with the wheel A, but for convenience it is adjustably connected to the rear transverse rods $d$, the ends of said rods being provided with slots $d'$ to receive the ends of the axle of said rear friction-wheel D' and which is adjustably secured in place by means of the set-screws $d^2$.

The forward portion of the curved rod C is jointed at E, and the forward ends of the transverse rods are also provided with slots $e$ to receive the ends of the axle $e'$ of the front friction-wheel D, and this axle is arranged and adapted to operate freely in said slotted ends of the transverse rods.

The front friction-wheel is operated to bring the same into frictional contact with the tire by means of the handle-bar F, which is supported on a curved rod $f$, pivoted to the stem $b^2$. The rear end of this rod $f$ is pivotally connected to the rods $f'$, which are also pivotally secured to the forward portion of the front transverse rods $b$. The rods $f'$ are provided with slots $f^2$ to receive the pins $f^3$, which project from the uprights B, and by means of which the said rods are guided in their movement. It will thus be clearly observed that when the handle-bar is thrown backward the rear end of the curved rod $f$ is depressed, which in turn depresses the connecting-rods $f'$ and the forward ends of the front transverse rods $b$, and causes the friction-wheel D to be drawn into closer frictional contact with the tire of the wheel. The curved rod $f$ passes up through an opening formed in a flattened portion of the semicircular rod C.

In Fig. 1 is also shown a locking-bar M, which is attached to the handle in the usual manner, and the lower end thereof is adapted to engage the teeth $m$ on the outer edge of the flattened portion $m'$ of the semicircular rod C, so that when the handle is adjusted and the rod F depressed it can be maintained in this position by engaging the end of the locking-bar M with the teeth $m$. The lower end of the vertical arm of the locking-bar is provided with a long tooth fitting into those at $m$. Said locking-bar is held in position by a band $m^2$, connected with the S-shaped rod or handle.

Having fully described my invention, what I claim, and desire to secure by Letters Patent, is—

1. In a monocycle, the combination of a single wheel, a semicircular rod supported above said wheel and carrying the friction-wheel to contact with the periphery of the wheel, the uprights, the transverse rods having slots at each end to receive the ends of the axles of the friction-wheels, brace-rods, the handle-bar, a curved rod supporting said handle-bar and connecting-rods pivotally secured to the rear ends of said curved rods and to the transverse rods whereby the front friction-wheel may be thrown into close frictional contact with the periphery of the wheel, substantially as described.

2. The combination with a wheel, the axle of which is provided with crank-shaft carrying pedals, of a fork or upright, the bifurcated ends of which are connected with the axle of the wheel, and transverse rods connected with the fork and extending obliquely thereto, the forward end of said rods being provided with a transverse slot and a friction-wheel mounted in said slot, the rear rods being provided with longitudinal slots, brace-rods connected with the bifurcated portions of the fork and with the rear extremity of the rear transverse rods, a curved rod extending half-way around the periphery of the wheel and carrying at its ends guards or plates or scrapers to remove matter adhering to the tire of the wheel, said curved rod being connected with the ends of the transverse rods, a block through which said curved rod passes, said block being also provided with a tubular projection in which projection the stem of the fork is secured, a saddle secured to said block, the forward end of said curved rod being jointed or hinged and having a slot, a rod $f'$ pivoted to the stem of the fork provided with a slot adapted to receive a pin upon the bifurcated portions of the fork, the lower ends of said rods $f'$ being pivoted to the forward portion of the transverse rod, an S-shaped rod $f$, pivoted to the stem of the fork and extending through the slot in the curved rod, the rear end of said S-shaped rod being pivotally connected with the upper ends of the rods $f'$, and handle-bar provided with handles secured to the upper end of the S-shaped rod, whereby the forward friction-wheel can be readily thrown in contact with the tire of the wheel by the backward pull upon the handle-bar, substantially as described.

In testimony that I claim the foregoing as my invention I have signed my name, in presence of two witnesses, this 20th day of June, 1895.

ANDREW A. MUNRO.

Witnesses:
L. M. MULLER,
E. VAN DEURSEN.